United States Patent [19]
Godefroy

[11] 3,838,595

[45] Oct. 1, 1974

[54] DATA ACQUISITION CIRCUIT FOR A MAGNETOSTRICTIVE DIGITAL THIN FILM SENSOR

[75] Inventor: Jean-Claude Godefroy, Chatillon-sous-Bagneux, France

[73] Assignee: Societe Lignes Telegraphiques et Telephoniques, Paris, France

[22] Filed: Mar. 16, 1973

[21] Appl. No.: 342,035

[52] U.S. Cl. ........ 73/88.5 R, 73/DIG. 2, 324/34 ST
[51] Int. Cl. ........................... G01b 7/18, G01l 1/22
[58] Field of Search .................... 73/88.5 R, DIG. 2; 324/34 MA, 34 ST

[56] References Cited
UNITED STATES PATENTS
3,229,512   1/1966   Goudswaard et al. ........... 73/88.5 R
FOREIGN PATENTS OR APPLICATIONS
1,297,890   6/1969   Germany ......................... 324/34 ST

*Primary Examiner*—Charles A. Ruehl
*Attorney, Agent, or Firm*—Kemon, Palmer & Estabrook

[57] ABSTRACT

A sensor with a digital electrical output based on the rotation of the axis of magnetization in a thin magnetostrictive film under the influence of a stress not co-linear with said axis. The new orientation of the magnetization axis is detected by means of a pulsed step-by-step rotating interrogating magnetic field established by a printed circuit interrogating lead. When such field crosses the perpendicular to the magnetizaton axis, the binary signal induced in a printed read circuit switches from a first binary value to the second value. The count of the binary read pulses before switch over is a measure of the angular position of the magnetization axis.

4 Claims, 8 Drawing Figures

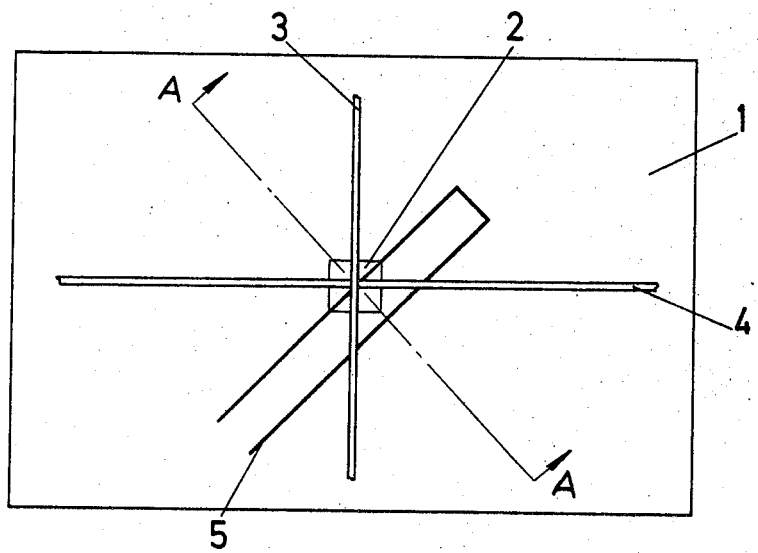
Fig. 4
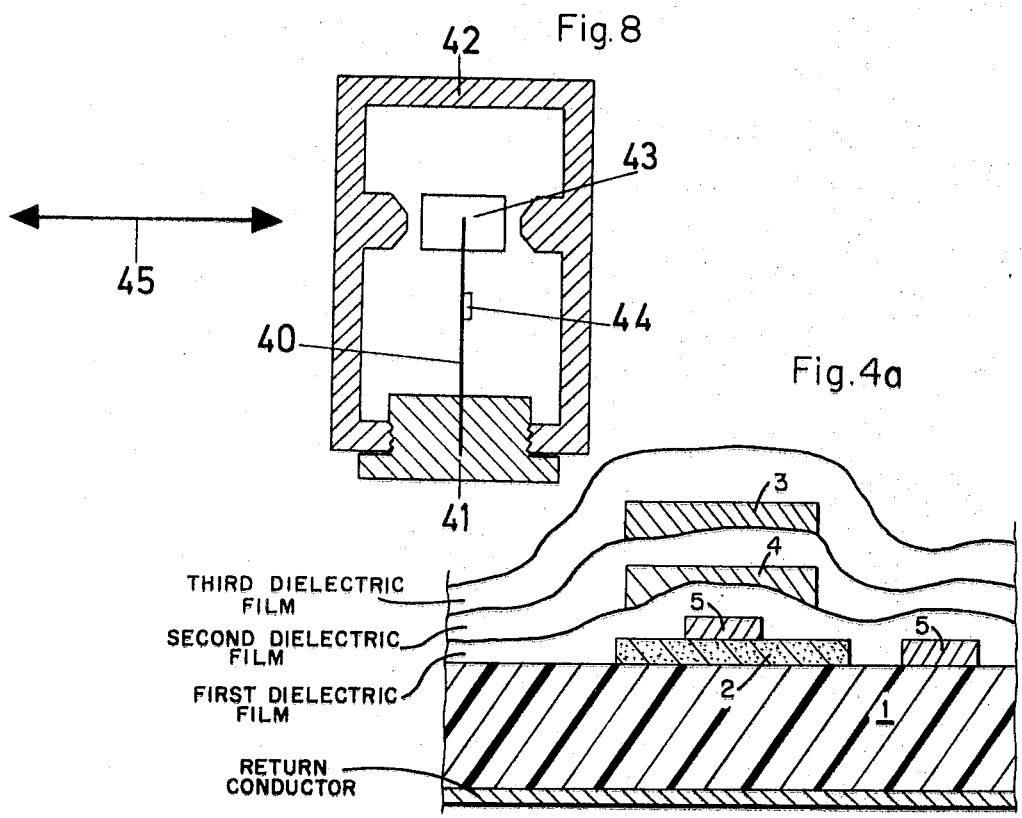
Fig. 8
Fig. 4a

DATA ACQUISITION CIRCUIT FOR A MAGNETOSTRICTIVE DIGITAL THIN FILM SENSOR

BACKGROUND OF THE INVENTION

The present invention relates to a sensor, that is to say a device for converting a physical quantity (which may be variable in the course of time) into an electrical signal (which may be variable in the course of time). The known devices are generally of the analog type, the amplitude of the electrical signal supplied being a monotonic function of the value of the input quantity. The processing of the information, in modern data acquisition and processing systems, takes place on coded signals representing the analog value in accordance with a given law, which is generally quantified. Each analog sensor must be associated with an analog to digital converter. Such a converter is capable of introducing conversion errors; it is relatively complex and is costly, especially when it is necessary to produce very short conversion times, which is the case notably when the quantities change rapidly.

In order to obviate this disadvantage, there have been proposed certain types of sensors which supply already encoded information. The U.S. application filed by the Assignees on Apr. 20th, 1972, Ser. No. 245,979 now U.S. Pat. No. 3,807,223 for: "Stress sensor with digital output" discloses a digital output stress transducer based on the rotation of the easy axis of a magnetostrictive film under the action of a non-colinear stress on the easy axis. The new orientation of the easy axis of magnetization is detected with the aid of a set of cells located at different points on the film in the form of the electromotive force induced by the variation of the flux produced by a pulsed interrogating magnetic field having an optimum direction, for example close to the perpendicular to the direction of the easy axis of magnetization before application of the stress. Two methods are employed in accordance with the patent to detect rotation of the easy axis, both of which utilize a certain number of cells each comprising an interrogation device and a reading device, which are associated with a common magnetic film spot. In the first method, the cells are subjected to a common stress and the orientation of the reading conductors varies gradually from one cell to the other and the cells are successively interogated. In accordance with the second method, the interrogation and reading leads have respective fixed orientations and the cells are distributed over the substrate in such manner as to undergo different stresses. A combination of the two methods is also provided for.

The present invention relates to the use, in a sensor of this type, of a method of detecting the rotation of the easy axis of magnetization under the action of the stress to be measured, which permits an appreciable simplification in the production of the sensor as compared with the method described in the aforesaid application.

BRIEF DISCLOSURE OF THE INVENTION

In accordance with one essential feature of the invention, the angular position of the magnetization vector of a thin magnetostrictive ferromagnetic film having uniaxial anisotropy is detected in a single cell by means of the voltage induced in the reading loop by an interrogation device which sets up a pulsed magnetic field actuated with a step-by-step rotation. In the following, "pulsed rotating magnetic field" means a magnetic field whose orientation in relation to a fixed spatial reference undergoes a step-by-step rotation and whose intensity suddenly changes from a zero value to a given fixed value, is maintained at this value for a first fixed period and returns to a reference value (optionally zero), for a second period (which may be different from the preceding one) before returning to the first value for a period equal to the first period, and so on. It is well known that such a magnetic field may be obtained, for example, from two orthogonal components situated in the plane of the film, whose amplitudes are a function of the sine and of the cosine respectively of a common angle, and which are pulse-modulated in the course of time. The law of variation in time of the argument of the sine defines the rotation of the resultant magnetic field in the plane of the film. If a fixed axis is defined in the plane of the film, the rotating pulsed magentic field successively occupies positions which define a discrete train of angle values with the said axis. In order to fix ideas, it may be assumed that the direction of the reference axis is that of the easy axis of magnetization of the film in the absence of stress, that is to say, OX in FIG. 1. The wasy axis is directed along OA when a stress $\sigma$ directed along OC is applied to the film. There is shown at OH the direction, at a given instant, of the interrogation field, which is at an angle $\alpha$ to the direction OX of the easy axis in the absence of stress. In the figure, $\alpha < 90°$. Therefore, the interrogation field has the effect of turning the easy axis through an angle of less than 90°. When the interrogation field ceases, the easy axis returns to its initial direction OX. The readout is non-destructive and takes place by means of the flux variation which accompanies the return of the megnetization vector to its initial direction. After application of the stress, the easy axis is directed along OA. The angle OH, OA = $\alpha + \theta$ is greater than 90°. On disappearance of the interrogation field, the magnetization vector returns to the direction OA′ opposite to OA. There is thereby obtained in the reading circuit a flux variation of opposite direction, and hence the state of the binary information has changed in relation to what it was in the absence of stress. Depending upon the angular position of OH in relation to OA, the magnetization vector OA returns, after disappearance of the interrogation field, either to its initial position, in which there is set up in the fixed reading conductor an induced voltage of a first polarity, or to a position 180° from its initial position, in which case a voltage of opposite polarity is set up in the read circuit. The passage of the rotating field OH through a position substantially normal to OA therefore results in a reversal of the direction of the voltage induced in the associated reading circuit. If the position of the vector OH at the instant of the reversal of the direction of the voltage induced in the reading circuit is known, it is possible to deduce therefrom the orientation of OA, i.e., the amplitude $\sigma$ of the stress since the direction OC is also known.

As will be apparent, the angle of the rotation of the easy axis of magnetization of a magnetic film under the action of the stress to be measured may be detected by means of a single cell, that is to say, a single elemental spot of the film, associated with its interrogation and reading leads, while this detection necessitated, in accordance with the above-mentioned earlier patent application, the interrogation of a set of elemental cells.

The angle detection in the latter case involved a spatial distribution either of the interrogation leads or of the film spots corresponding to each cell. In the present invention, it involves a spatial exploration which is transformed in the sensor itself into time modulated signal.

The present invention makes it possible to obviate the necessity to provide interrogation leads arranged according to a precise geometrical distribution. It also effects a reduction in the useful area of the magnetic film to a single cell, which results in a reduction in the overall dimensions and in the required electrical energy. The heterogeneity of the film and the dispersion of its characteristics no longer have any effect.

The sensor according to the invention makes it possible to obtain the value of a stress limited within a very small zone of the substrate, and if desired a point-by-point detection of the stress can be effected by means of a set of transducers. The production of coded measurement signals from the reading signals involves electronic equipment which is perhaps more complex than in the embodiments of the invention which have been referred to in the foregoing. However, the necessary circuits are commercially available as of integrated circuits.

DETAILED DISCLOSURE OF THE INVENTION

The invention will be clearly understood by reference to the following description and to the accompanying figures, which are given as a non-limiting illustration of the invention, and in which:

FIG. 4 is a diagrammatic representation of the cell of the transducer according to the invention, FIG. 4A is a diagrammatic sectional view of the cell of the transducer.

FIG. 8 is an example of the application of a sensor according to the invention to an accelerometer.

Figure 1:
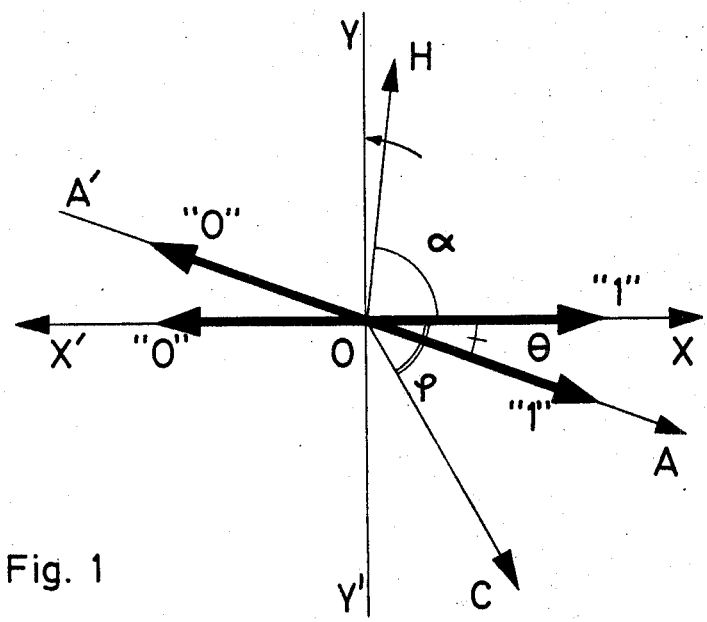
FIG. 1 is a diagram illustrating the principle of the sensor.

The physical phenomenon on which the detection of the information in the present invention is based has already been described in the foregoing with reference to FIG. 1, which is shown by way of explanation.

Figure 2:
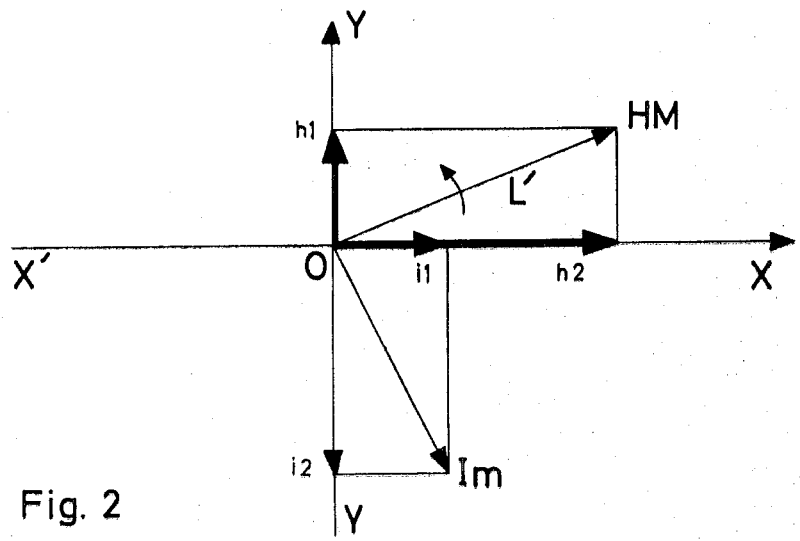
FIG. 2 is a diagram illustrating the production of a rotating field.

FIG. 2 illustrates the method of producing a rotating field from two orthogonal currents shown at $i_1$ and $i_2$ in the figure, where:

$i_1 = I_m \cos \omega t$
$i_2 = I_m \sin \omega t$

The currents are supplied to two interrogation field leads which are so disposed as to set up two mutually orthogonal field components denoted by $h_1$ and $h_2$, where:

$\vec{h_1} = \vec{H_M} \cos \omega t$
$\vec{h_2} = \vec{H_M} \sin \omega t$

The vector sum $\vec{h} = \vec{h_1} + \vec{h_2}$ represents the resultant field, which is of constant amplitude $H_M$, and of angular velocity $\omega$. If the currents $i_1$ and $i_2$ consist of two pulse trains, the amplitude of each pulse being constant, the successive amplitudes of the pulses of one of the two trains represent values belonging to a sine function, those of the pulses of the other train, belonging to the same sine function, having undergone a 90° phase shift. The resultant field is a pulsed field successively occupying a series of different angular positions. These positions are defined, since the amplitude of the two interrogation currents remains constant during each pulse. The determination of the angular positions actually occupied by the magnetic field results from the choice of the relative values of the amplitudes of the pulses. The number of positions occupied by the field in the course of one complete revolution depends upon the ratio of the frequency of the pulses to the frequency of rotation of the field defined by the pulsation of the interrogation currents. The formation of the interrogation field according to the present invention will be understood from the curves of FIG. 3.

Figure 3:
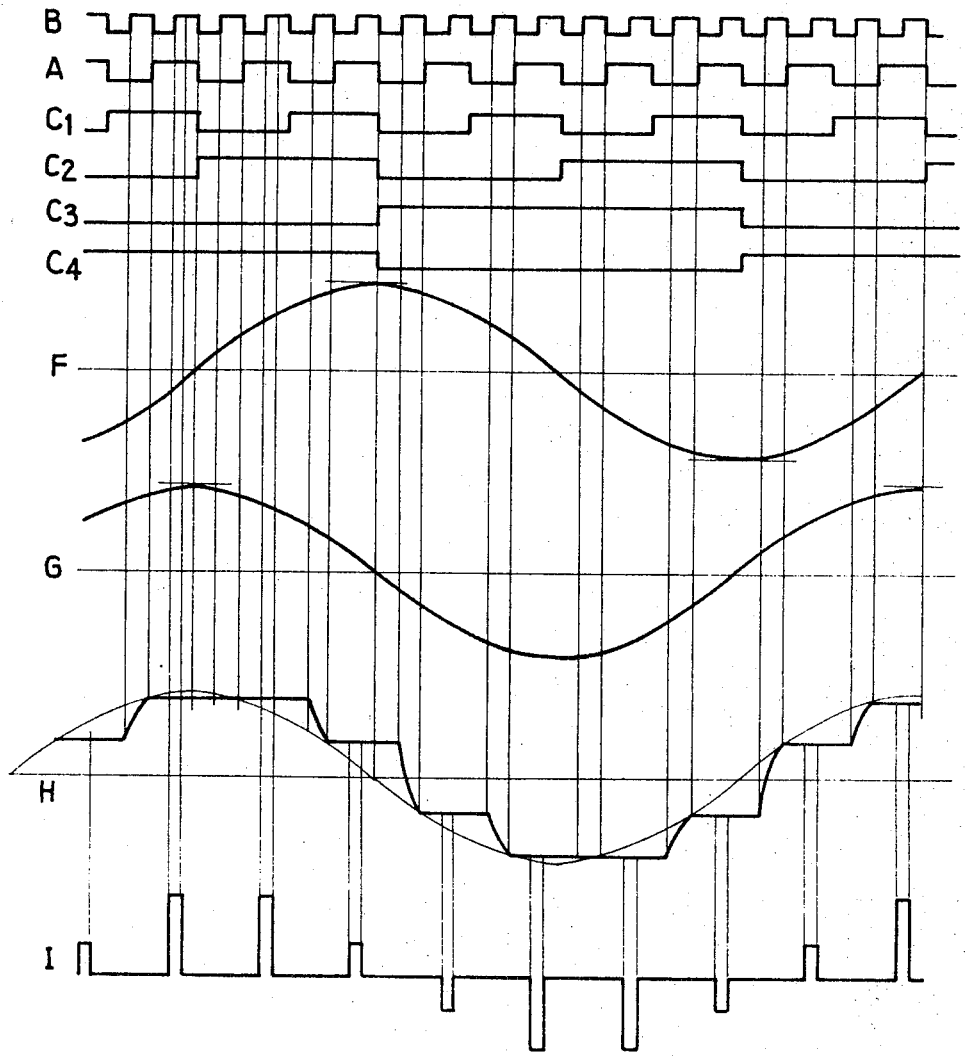
FIG. 3 is a set of curves relative to the production of the interrogation field.

The curve A of FIG. 3 represents the signal from a clock for the synchronization of all the interrogation and reading circuits of the cell. Above the signal A, there is shown the signal B, at double frequency, whose leading edges define instants situated within the positive half-cycles of the clock signal A, at which the interrogation pulses occur. The signals represented at $C_1$, $C_2$, $C_3$ and $C_4$ correspond to the output signal of successive frequency-halving stages. For reasons of scale, only four signals are shown; the application of the invention necessitates a division of the frequency of the clock signal by a coefficient corresponding to the numbers of positions (here reduced to sixteen) explored in the course of one revolution of the interrogation field. The signal from the last frequency divider stage $C_4$ serves for the control of the generator producing sinusoidal currents intended to set the amplitude of the interrogation pulses synchronized by the leading edges of the signal B which are situated midway along the positive half-cycles of A. A function generator supplies the signals F and G representing respectively the cosine function and the sine function. As is well known these functions are continuous. If the signals G and H were used as such for the amplitude modulation of the interrogation pulses, the amplitude of the latter would vary during their duration and the direction of the resultant field would not be fixed during this duration. The signals F and G are therefore sampled at the frequency of the signal A (in coincidence with the negativegoing edges of this square signal) and the sampled value stored until the succeeding sampling time. The signal resulting from the sampling of the curve G is shown at H. The corresponding modulated pulses are represented by the curve I. There is time coincidence between the midpoint of these pulses and mid-point of the sampling duration. As will be apparent, a period of the current corresponding to a complete revolution of the interrogation field contains sixteen pulses, the ratio of the frequency H of the clock pulses (curve A) to that of the signal $C_4$ being equal to one-sixteenth.

FIGS. 4 and 4A are diagrammatic illustrations of the cell of the sensor according to the invention. There is denoted by 1 the substrate, the nature of which depends essentially upon the use of the sensor. The substrate is generally a resilient wafer performing both the function of a mechanical support for the thin film 2 and the function of a means for transforming a deformation or a displacement into stress on the film. The magnetic film 2 occupies a very small area of the substrate, which ensures that it is homogeneous and reproducible. It is produced by any one of the known methods usually employed in the production of thin magnetic films, notably for memories. The interrogation circuit consists essentially of two mutually orthogonal leads 3 and 4, of which the electric circuit is closed by a conductive plane shown in FIG. 4A, which occupies the lower face of the substrate. These two leads receive respectively the pulsed signals modulated according to sampled values of the cosine and sine signals, as explained in the foregoing. The read circuit is shown at 5 in the form of a hairpin lead which effects a differential reading, one of the arms of the conductor being magnetically coupled to the thin film 2 and the other being shown directly on a bare portion of the substrate. It is well known that it is possible by using read leads of this type to eliminate the majority of stray signals interfering with the reading.

In accordance with what has been recalled in the foregoing (FIG. 3), it is possible to obtain, with the aid of a rotating field, an exploration of the whole plane of the substrate, that is to say, an exploration covering an angle of $2\pi$ radians around the centre of the magnetic film 2. However, such a wide angle scanning is rarely necessary, since it is known that the rotation of the easy axis under the influence of a stress canonot exceed a limit in the neighbourhood of 90°, as has been expalained in the patent application already cited. The value of the rotation $\theta$ is given, as a first approximation, by the formula:

$$\tan 2\theta = K_2/K_1 \sin 2\phi / 1 + K_2/K_1 \cos 2\phi$$

wherein:

$\theta$ is the rotation of the easy axis under the action of the stress.

$K_1$ and $K_2$ are constants, of which $K_1$ introduces the saturation magnetization and the anisotrophy field of the thin film, and $K_2$ the stress and the coefficient of magnetostriction, and $\phi$ is the angle between the stress direction and the direction of the easy axis in the absence of stress.

On the other hand, as is apparent from the foregoing explanations concerning the interrogation field, the angular sector which is scanned may be defined in position and in opening by a proper adjustment of the sinusoidal function generator. Indeed, it may be advantageous to reduce the angular sector scanned to the minimum value, having regard to the particular operating conditions of the sensor under consideration, with a view inter alia to increasing the interrogation frequency without increasing the frequency of the pulses, and to reducing the dead times.

Figure 5:
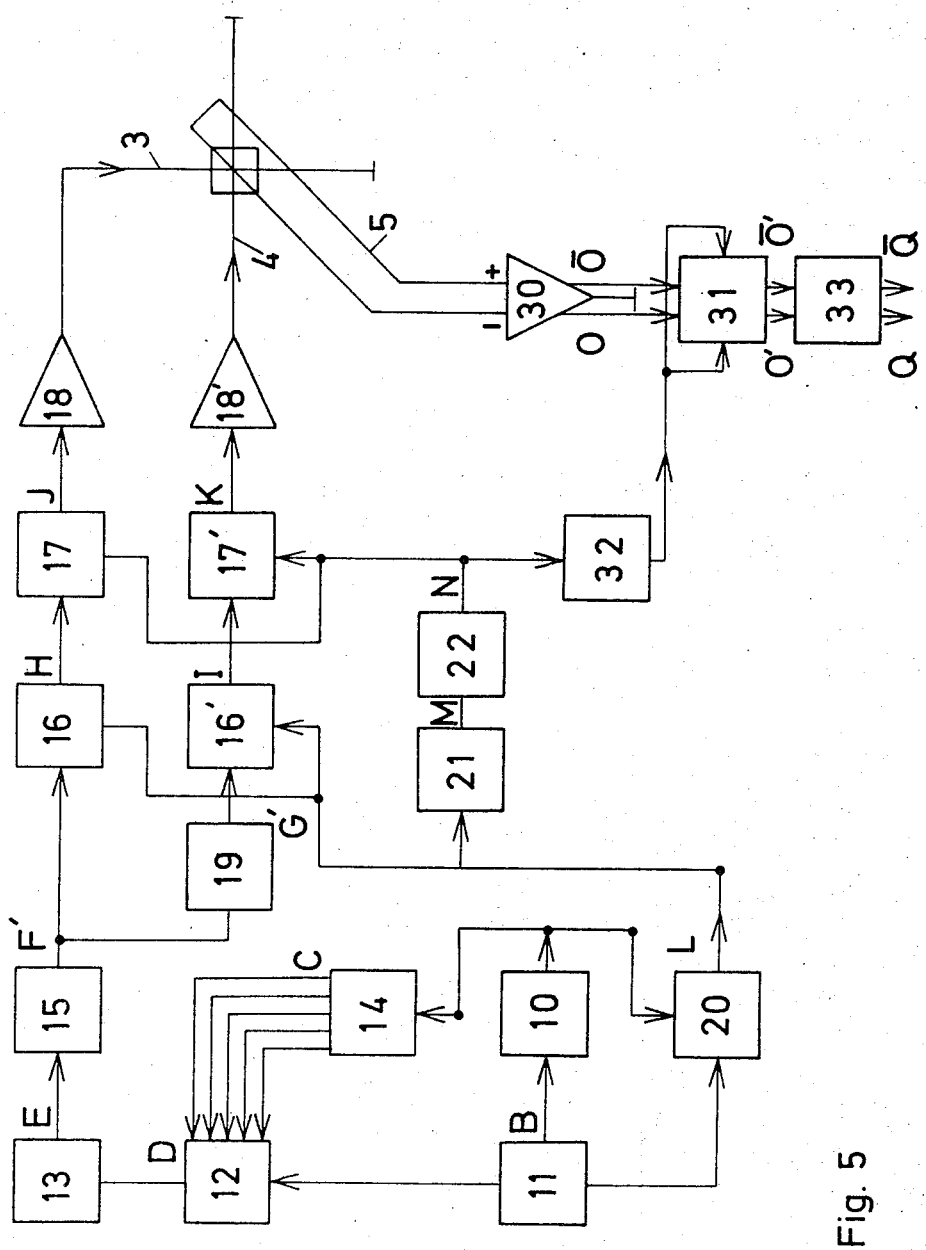
FIG. 5 is a block diagram of a particular form of the interrogation and reading circuit associated with the cell of FIG. 4, FIGS. 6 and 7 are sets of curves representing the signals set up at the corresponding points of the circuit of FIG. 5.
Figure 6:
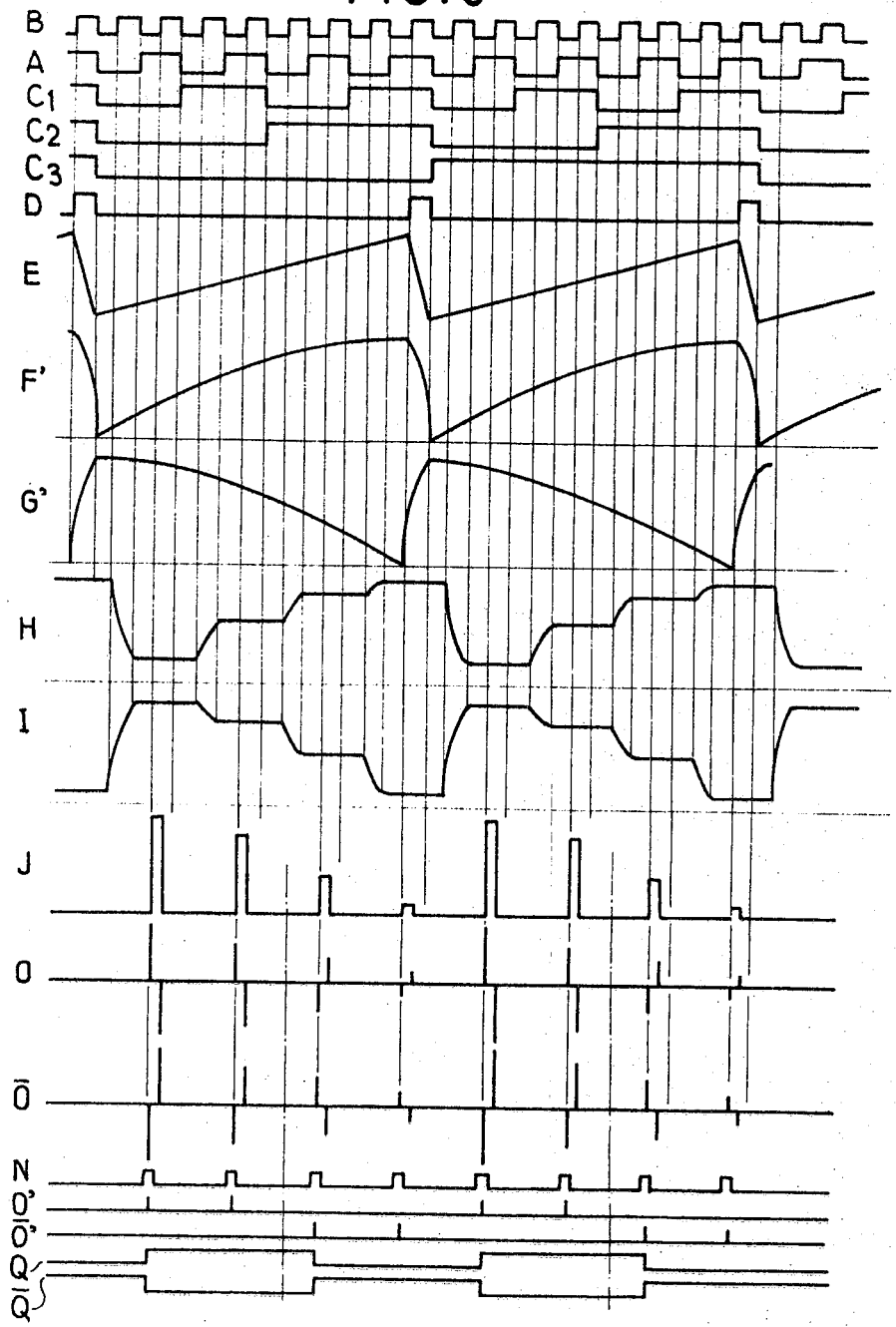

FIGS. 5 and 6 illustrate the circuits and the signals corresponding to the interrogation of an angular sector of 90° opening, which corresponds to a practical case of application of a cell according to the invention.

There are diagrammatically shown on the right of FIG. 5 the various elements of the cell of the transducer according to the invention as illustrated in FIG. 4. There are shown in the upper left-hand part of the diagram all the interrogation circuits feeding the leads 3 and 4, and in the lower right-hand part all the reading circuits associated with lead 5. The interrogation signal generators comprise identical elements for the two interrogation leads. These circuits comprise essentially a clock 10 supplying a reference signal A and fed by an oscillator 11 which supplies a signal B, the clock 10 consisting essentially of a bistable circuit supplying a reference signal at half the frequency (for example 500 KHz) of oscillation from 11. This signal is applied to a number of frequency dividing stages denoted by 14 in order to divide the frequency by the required number of interrogations per cycle. In order to permit graphical representation, this number is here made equal to eight. However, it is to be understood that its value may with advantage be up to one hundred. It fixes the uncertainty of the angle detection. The output signal is $C_3$. The square wave signals $C_1$, $C_2$, $C_3$, etc. are applied to a gate 12 which also receives the signal B from the oscillator 11. The gate 12 transmits only the pulse B which is produced immediately after a negative-going edge of the first signal $C_1$. This signal appears at D. It controls the time constant switching circuit of the integrator 13, which thus supplies a sawtooth voltage E serving as a control signal for the sine-cosine function generator 15. The signal supplied by 15 and represented by the curve B' reproduces, for example, one-quarter of a sinusoid, which corresponds to an exploration of an angular section of $\pi/2$. It is applied to the memory-type sampling circuit 16 which receives sampling signals supplied from the oscillator 11, at the freqeuency of the clock 10, through the AND circuit 20 controlled by the clock 10. The signal stored at 16 is represented by the curve H. It represents the value of the sine function stored at the instant of the trailing edge of the pulse B transmitted by 20 and retained for a time interval equal to the period of the clock 10. A stepped signal H has thus been obtained.

Figure 7:
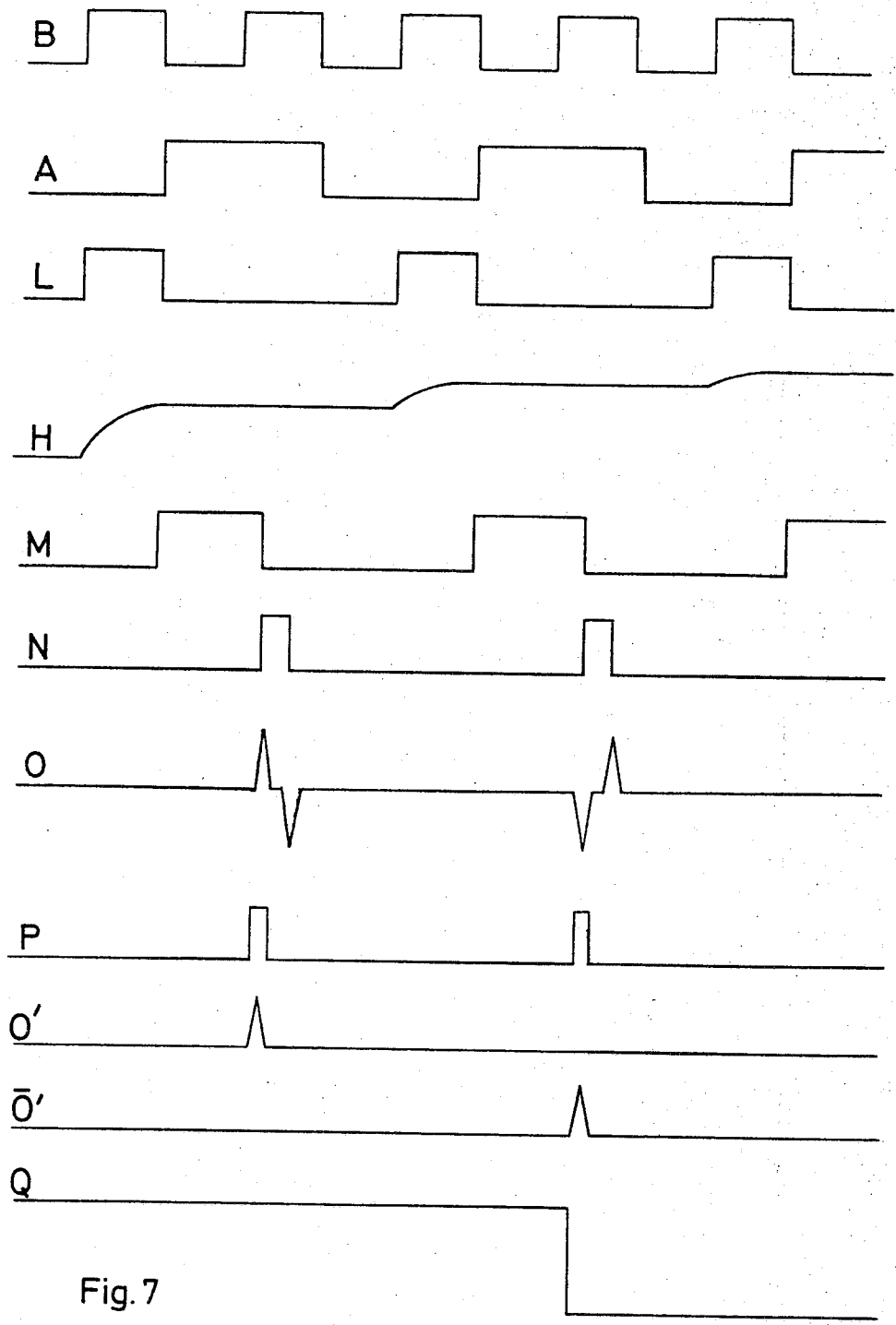

This signal defines the amplitude, constant throughout the duration of one pulse, of the interrogation pulses applied to the conductor 3 of the sensor. The instants when these pulses occur are fixed by means of the analog gate 17 controlled by means of signals supplied by 20 and appropriately delayed by two monostable stages 21 and 22. The first will be called the interrogation delay monostable stage and the second, 22, the interrogation period control monostable stage. In order to permit an expansion of the time scale, which is essential for an understanding, the signals relative to the control of the gate 17 are shown in FIG. 7. In order to illustrate the time scale, the signals B and A of the oscillator and of the clock are also shown. The curve L represents the oscillator signals which are transmitted by the circuit 20 and control the memory 16, of which the signal H is plotted to scale in FIG. 7. The transitions from one step to the next are more clearly apparent therein than in FIG. 6. The first monostable stage 21 has the object of delaying the instant when the interrogation pulse occurs in relation to the sampling instant, so that the interrogation pulse clearly corresponds to a level stage of the signal H. The signals M emanating from 21 are synchronized with the pulses L controlling the memory 16. The second monostable stage 22, which is triggered by the first, has a changeover duration which defines the width of the interrogation pulse (see J, FIG. 6). It supplies the signals N which control the opening of the analog gate 17. The gate 17 transmits the analog signal stored at 16 during the period of the pulses N. This signal constitutes the pulsed interrogation signal denoted by J in FIG. 6.

The signal supplied by the function generator 15 is applied to a second network 16' – 17' consisting of circuits identical to 16 and 17, through an analog integrator circuit (or 90° phase shifter) 19. There are shown at G' and I respectively the signals emanating from 19 and 16'. The pulses J and K (not illustrated) are amplified at 18 and 18' respectively before being applied to the interrogation leads 3 and 4.

The read lead 5 is connected to the two inputs of a differential amplifier 30. The reading signals consist of very short pulses (O in FIG. 6) coinciding with the leading edges of the pulses such as J of the interrogation field. As is explained in the foregoing, when the orientation of the interrogation field intersects the normal to the direction of the easy axis, the polarity of the induced signal is reversed. The broken vertical axes show the instants of each cycle at which this intersection takes place. A reversal of the polarity of the signal O is observed after this passage. The amplifier 30 has a double output supplying the signals O and the inverted signals O represented by $\bar{O}$ in accordance with the usual practice. These two signals are applied to the symmetrical inputs of the digital gate 31 controlled by the clock signals A. As will be more clearly apparent from FIG. 7, the signals O and $\bar{O}$ (in synchronism with the edges of the pulses N) occur during the positive half-cycles of A. However, in order to simplify the utilization of the reading signals, only the signal corresponding to the positive-going edge of N is retained. The control signal P of the double gate 31 is supplied by the monostable stage 32 synchronized with the signal N of the monostable stage 22 (interrogation control pulses). The duration of the signal P is calculated as a function of the propagation constant in 17 – 18, of the change-over time of the layer and of the propagation time in the amplifier 30, so that only the first part of the double reading signal is transmitted through the double gate 31, which supplies the complementary signals O' and $\bar{O'}$. In order to simplify the reading, the various delays have not been plotted on the curves of FIG. 7. The two signals O' and $\bar{O'}$ are applied to the two inputs of a RS triggered bistable stage, the operation of which is explained notably in the book "Les schémas d'automatisme" by J. P. Raymond, published by Dunod, page 81 of the 1971 edition (Bascule RS synchronisée). It is known that the bistable stage supplies two complementary signals Q and $\bar{Q}$. The state of the output Q is changed when the states of the signals applied to both inputs change. Such a change of state is illustrated in FIG. 7, the sensitive position of the interrogation field being represented by the broken vertical line, as in FIG. 6. In the absence of signals O and O', the signals Q and $\bar{Q'}$ retain their previous value. The transitions of the signals Q and $\bar{Q'}$ represent, as a function of time, the position of the interrogation field which immediately succeeds the passage of this field through a position normal to the orientation of the easy axis of magnetization of the cell, which orientation is a function of the stress $\sigma$ which is applied thereto. The signals Q and $\bar{Q'}$ may be used for any calculation or display purpose. The sets of interrogation and reading circuits just described constitute a particular embodiment referred to by way of non-limiting illustration. The output circuits have been particularly chosen by reason of their high sensitivity, notably in regard to the circuits 31 and 33.

The various circuits constituting the elements of the block diagram of FIG. 5 are commercially available logic or analog integrated circuits. In a particular embodiment, the following choice, referred to by way of non-limiting illustration, was made (the references relate to FIG. 5):

10—SN 7473 N (½) of Texas Instruments
11—SN 7400 N (¾) of Texas Instruments
12—SN 7473 N (3½ for division by 128) of Texas Instruments
13 — operational amplifier ICL 8017 C (integrator) of Intersil
14—SN 7430 N (1) of Texas Instruments
15 — circuit obtainable from Burr-Brown, reference 4118-25
16 and 16'— circuit obtainable from National Semiconductor NH 0023
17 and 17'— analog gate, discrete components
18 and 18'— circuit obtainable from National Semiconductor NH 0002
19 — operational amplifier ICL 8017 C (integrator) of Intersil
21—SN 74121 N (1) of Texas Instruments
22—SN 74121 N (1) of Texas Instruments
30 — circuit obtainable from Motorola MC 1509
31 — circuit obtainable from Motorola MC 1010
33 — circuit obtainable from Motorola MC 1014

FIG. 8 illustrates an application of a sensor according to the invention to the construction of an accelerometer. There is shown at 40 a reed whose lower end is set into a plug 41 which seals a rigid enclosure 42 filled with a medium ensuring appropriate damping of the device. A weight 43 is mounted on the free end of the reed in the usual way. The sensor is integrally connected to the reed 40 or directly deposited thereon. It is shown to an enlarged scale at 44. As is well known, when an acceleration directed along the axis 45 is applied to the device, the reed 40 is subjected to a flexure which depends mainly upon the value of the acceleration, upon the value of the mass 43, upon the rigidity of the reed 40 and upon the viscosity of the medium filling the enclosure 42. This displacement is detected by the sensor 44. The parameters of the accelerometer are chosen in accordance with the range of values to be measured.

What we claim:

1. A magnetostrictive stress sensor having a digital output signal comprising a substrate;
    a common return conductor deposited on one face of said substrate;
    a thin localized magnetic film deposited on the opposite face of said substrate;
    conductive sensing means printed on said film;
    a first dielectric film overlying and contacting said magnetic film and sensing means;
    a first conductive interrogating means printed on said first dielectric film;
    a second dielectric film overlying and contacting said first interrogating means;
    a second conductive interrogating means printed on said second dielectric film;
    a third dielectric film overlying and contacting said second interrogating means;
    electrical generating means connected to supply interrogating signals to said first and second interrogating means; and
    receiving means connected to said sensing means.

2. A stress sensor as defined by claim 1 in which said first and second interrogating means comprise two mutually perpendicular conductors with their crossing points overlying said magnetostrictive film and in which said sensing means comprises a hair pin shaped printed conductor one of the two legs of which passes in alignment with said crossing point and is oriented at substantially 45° to said interrogating conductors.

3. A stress sensor as defined by claim 1 in which said electrical generating means comprises a source of pulsed current amplitude modulated by two synchronized sinusoidal signals which are 90° out of phase with each other.

4. A stress sensor as defined by claim 3 including a circuit connected to said sensing means, said circuit including a double gate and an RS triggered switch.

* * * * *

UNITED STATES PATENT OFFICE
CERTIFICATE OF CORRECTION

PATENT NO. : 3,838,595
DATED : October 1, 1974
INVENTOR(S) : JEAN-CLAUDE GODEFROY It is certified that error appears in the above-identified patent and that said Letters Patent are hereby corrected as shown below:

Not shown:

[30]  Foreign Application Priority Data

March 28, 1972      France.....72.10.780

Signed and sealed this 20th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,838,595            Dated October 1, 1974

Inventor(s) Jean-Claude Godefroy

It is certified that error appears in the above-identified patent and that said Letters Patent are hereby corrected as shown below:

After "[73] Assignee: Societe Lignes Telegraphiques et Telephoniques, Paris France", add ---and Office National D'Etudes et De Recherches Aerospatiales---.

Signed and Sealed this twenty-sixth Day of August 1975

[SEAL]

Attest:

RUTH C. MASON
*Attesting Officer*

C. MARSHALL DANN
*Commissioner of Patents and Trademarks*